(12) United States Patent
Katoh

(10) Patent No.: US 7,085,375 B2
(45) Date of Patent: Aug. 1, 2006

(54) SMALL-SIZED HINGE DEVICE

(75) Inventor: Hideo Katoh, Yokohama (JP)

(73) Assignee: Katoh Electrical Machinery Co., Ltd., Yokohama (JP)

( * ) Notice: Subject to any disclaimer, the term of this patent is extended or adjusted under 35 U.S.C. 154(b) by 736 days.

(21) Appl. No.: 09/880,191

(22) Filed: Jun. 13, 2001

(65) Prior Publication Data
US 2001/0053674 A1    Dec. 20, 2001

(30) Foreign Application Priority Data
Jun. 14, 2000  (JP) ............................. 2000-179017

(51) Int. Cl.
*H06M 1/00* (2006.01)
(52) U.S. Cl. .................. 379/433.13; 379/433.12; 379/440; 455/575.1; 455/575.3; 455/575.4; 16/303; 16/330
(58) Field of Classification Search ........ 379/433.13, 379/433.12, 440; 455/575.1, 575.3, 575.4; 16/303, 330
See application file for complete search history.

(56) References Cited
U.S. PATENT DOCUMENTS
5,697,124 A * 12/1997 Jung ........................ 16/341
5,923,751 A * 7/1999 Ohtsuka et al. ........ 379/433.13
5,966,776 A * 10/1999 Ona ............................. 16/328
6,065,187 A * 5/2000 Mischenko ................... 16/341
6,115,620 A * 9/2000 Colonna et al. .......... 455/569.1
6,633,643 B1 * 10/2003 Ona ...................... 379/433.13

FOREIGN PATENT DOCUMENTS
JP           0017932 A     1/2000    ................. 11/10

* cited by examiner

Primary Examiner—Quynh H. Nguyen
(74) Attorney, Agent, or Firm—Darby & Darby

(57) ABSTRACT

The present invention is a small-sized hinge device for connecting a first member and a second member rotating relatively to each other, such as a transmitter section and a receiver section of a twofold portable telephone, comprising a case body with baffle means mounted in one of the members, a fixed cam provided inside the case body, a shaft arrested by the case body with one end thereof passing through the fixed cam along its axial direction and the case body along its axial direction, an arresting body disposed in the other end of the shaft and attached to the other one of the members, a cam slider disposed to face the fixed cam and slide along an axial direction of the shaft with the rotation thereof arrested by the shaft, and a compression spring interposed resiliently between the cam slider and the arresting body.

10 Claims, 6 Drawing Sheets

180° ~360° : SAME AS IN 0° ~180°

SMALL-SIZED HINGE DEVICE

1. FIELD OF THE INVENTION

The present invention relates to a small-sized hinge device suitable for use in small-sized portable electronic equipment such as portable telephones and notebook type personal computers.

2. CONVENTIONAL ART

Conventionally, such a device as shown, for example, in Japanese Patent Laid-open 2000-17932 is generally known as this type of a small-sized hinge device, wherein a cam slider having a through hole along an axial direction thereof is housed inside a case body with a baffle, in which one end of the case body has a closure plate with a bearing hole and the other end is left open, in a slidable manner where the cam slider is arrested by the case body; and a shaft with which a fixed cam with a baffle is integrally formed at one end thereof is inserted from the open end of the case body and is allowed to pass through the through hole of the cam slider while the other end thereof protrudes from the bearing hole provided in the closure plate of the case body, so that a cam portion of the cam slider and the fixed cam contact and face each other, and at the same time a compression spring wound around the shaft is interposed resiliently between the cam slider and the inner surface of the closure plate of the cam slider, and an E-ring is further attached to the end of the shaft protruding from the closure plate.

In such a small-sized hinge device conventionally known in general, since the E-ring directly contacts and presses the closure plate of the case body due to the resilient force of the compression spring, friction force occurs between the E-ring and the closure plate when the shaft or the case body rotates, which causes the problems that it easily abrades and makes strange sounds, and when lubricating oil is applied in order to prevent them, the problem arises that the lubricating oil leaks out and makes hands and clothes get dirty.

3. OBJECT OF THE INVENTION

The object of the present invention is to solve these problems and to provide a small-sized hinge device with good operability and a simple structure suitable for use especially in small-sized electronic equipment such as portable telephones and notebook type personal computers by preventing it from abrading and lubricating oil from leaking outside.

4. SUMMARY OF THE INVENTION

In order to achieve the above object, the present invention, which connects a first member and a second member rotating relatively to each other, comprises a case body with baffle means mounted in one of the members, a fixed cam provided inside the case body, a shaft arrested by the case body with one end thereof passing through the fixed cam along its axial direction and the case body along its axial direction, an arresting body disposed at the other end of the shaft and attached to the other one of the members, a cam slider disposed to face the fixed cam and slide in an axial direction of the shaft with the rotation thereof arrested by the shaft, and a compression spring interposed resiliently between the cam slider and the arresting body.

The present invention, which connects a first member and a second member rotating relatively to each other, also comprises a case body with baffle means mounted in one of the members, a fixed cam provided inside the case body, a shaft arrested by the case body at one end thereof passing through the fixed cam along its axial direction and the case body along its axial direction, an arresting body disposed in the other end of the shaft and attached to the other one of the members, a cam slider disposed to face the fixed cam and slide in an axial direction of the shaft with the rotation thereof arrested by the shaft, a compression spring interposed resiliently between the cam slider and the arresting body, and a slider washer provided on a portion of the shaft engaging with the case body.

In both of the cases described above the fixed cam can be constituted independently of and accommodated in the case body in a state where the rotation thereof is arrested.

The present invention can also be constituted in such a manner where a cam portion disposed in the fixed cam is composed of a concave portion, a first inclined portion, which forms the concave portion, having a large and steep slope surface, a long and gentle inclined plane portion provided adjacent to the first inclined portion, and a second inclined portion provided adjacent to the inclined plane portion, which forms the concave portion, having another small and steep slope surface, so that a convex portion of the cam slider contacting the cam portion by pressure drops inside the first inclined portion of the fixed cam when the first member and the second member are in a closed state, and by opening both of the first member and the second member relatively to each other, it escapes from the first inclined portion of the concave portion to move down along the gently inclined plane portion, and when they are opened at an angle close to the maximum opening angle, it drops inside the concave portion from the second inclined portion.

In this case, the convex portion of the cam slider can be so constituted to drop inside the first inclined portion just before the first member and the second member are closed relatively to each other.

According to this invention, the first member and the second member can be a transmitter section and a receiver section of a portable telephone respectively.

5. BRIEF DESCRIPTION OF THE DRAWINGS

6. EMBODIMENTS

Figure 1:
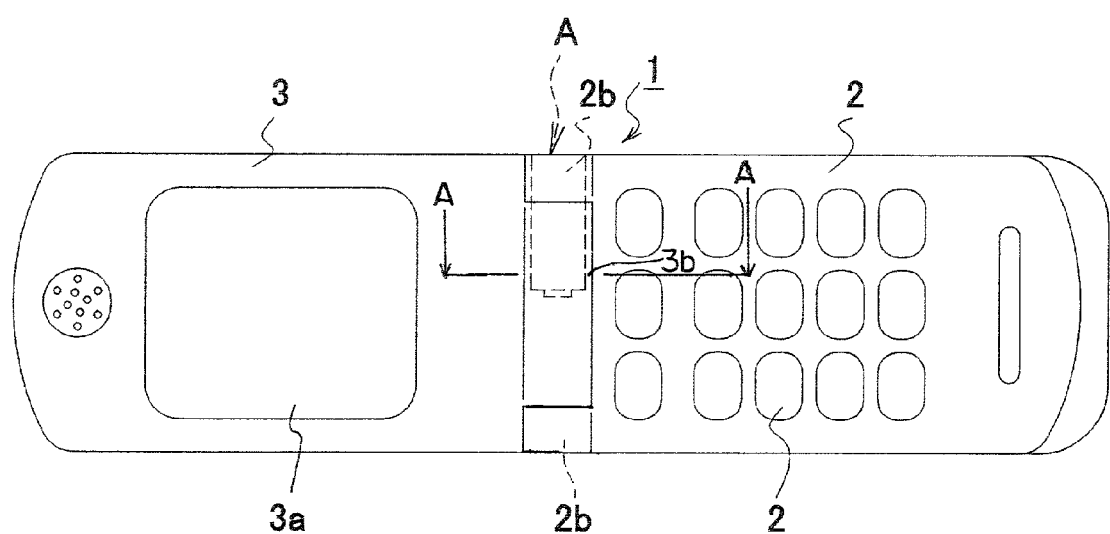
FIG. 1 is a plan view of a portable telephone using a small-sized hinge device according to the present invention.
Figure 2:
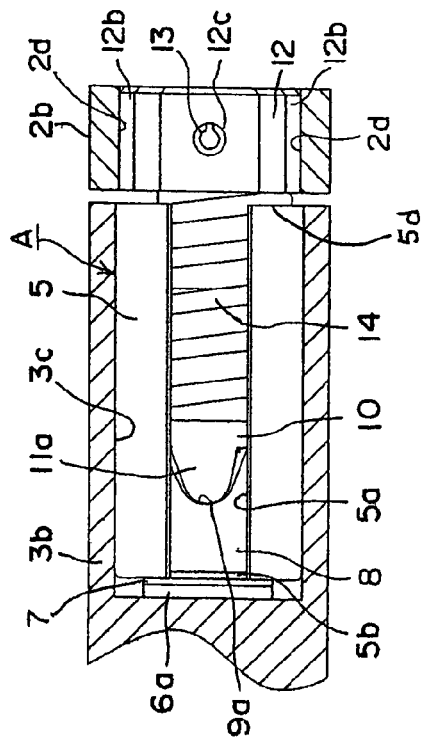
FIG. 2 is a front view of the small-sized hinge device according to the present invention.

The drawings show an embodiment of the present invention. FIG. 1 shows a twofold portable telephone 1, wherein mounting portions 2b and 3b are disposed in respective ends facing each other of a transmitter section 2 constituting a first member, on which a keyboard section 2a is disposed, and of a receiver section 3 constituting a second member, on which a liquid crystal display section 3a is disposed, and the mounting portions 2b and 3b are combined and connected with each other by a small-sized hinge device A so that the transmitter section 2 and the receiver section 3 can be opened and closed relatively to each other. Incidentally, though one small-sized hinge device A is used in the drawing, two small-sized hinge devices with the same structure or with structures different from each other may be used. When two small-sized hinge devices with the same structure are used, they are constituted to be symmetrical with each other.

FIG. 2 to FIG. 6 show the constitution of the small-sized hinge device A in detail. In the drawings, 5 denotes a case body and that shown in the drawings is accommodated inside the mounting portion 3b of the receiver section 3. Note that this is one example and the case body 5 may be accommodated in the mounting portion 2b of the transmitter section 2.

Figure 3:
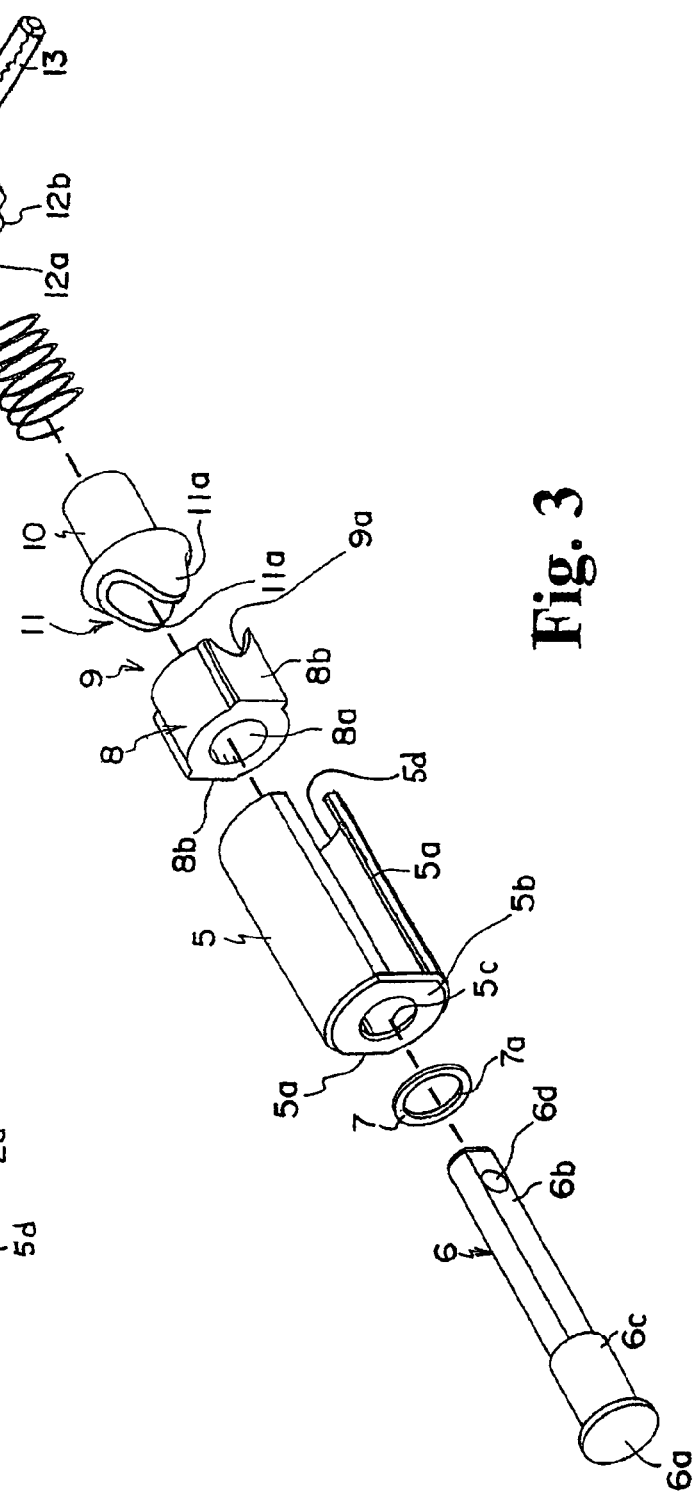
FIG. 3 is an exploded perspective view of the small-sized hinge device according to the present invention.
Figure 4:
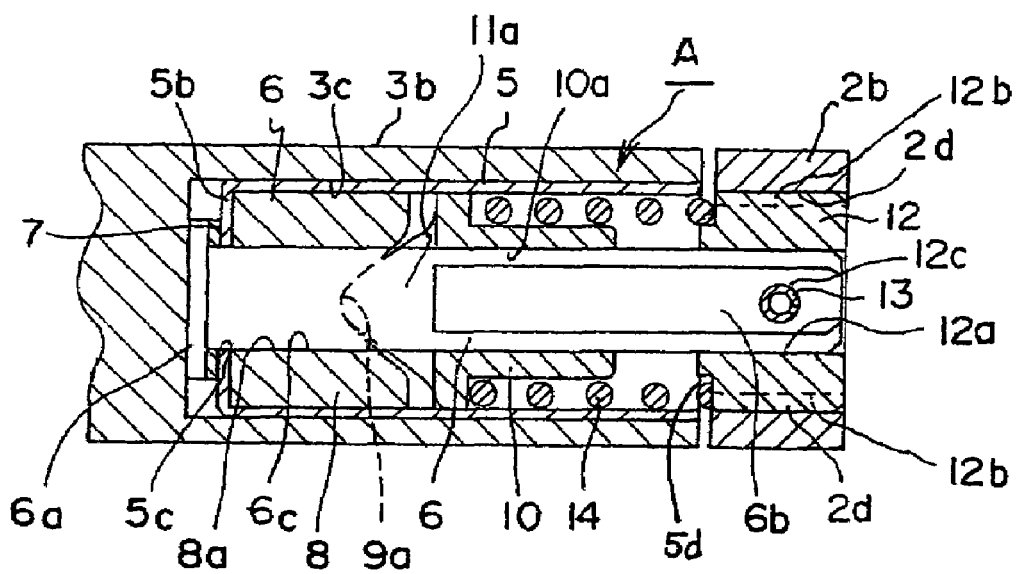
FIG. 4 is a vertical sectional view of the small-sized hinge device according to the present invention.
Figure 5:
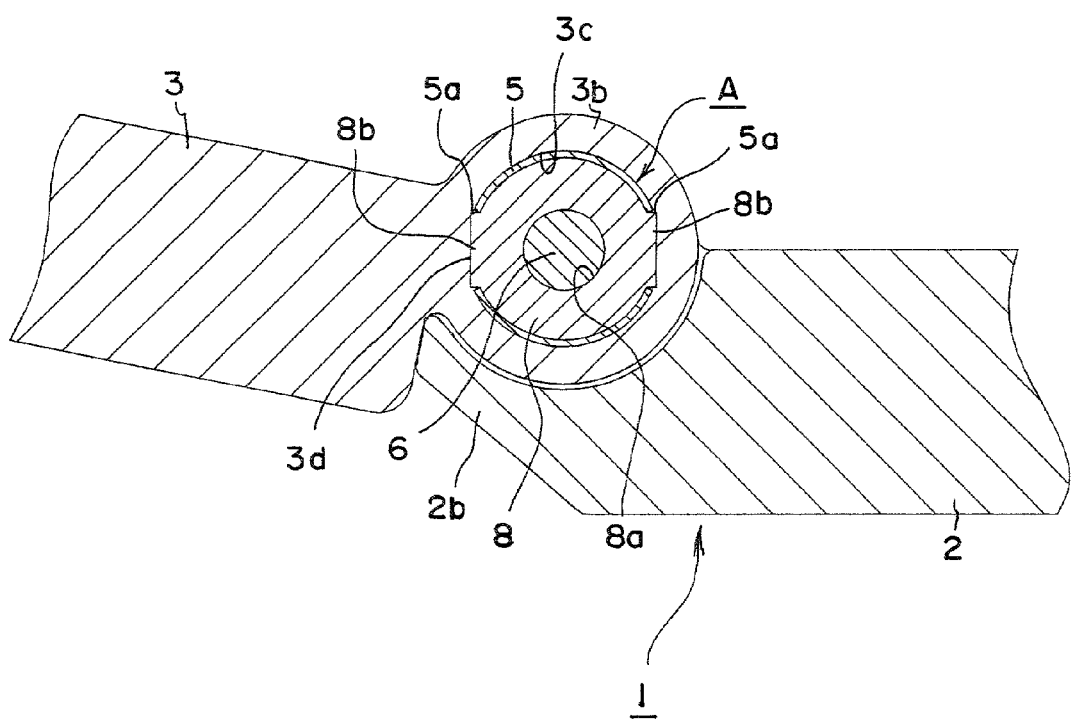
FIG. 5 is a sectional view taken along the A—A line in FIG. 1.

The case body 5 has one end being open end 5d, arresting portions 5a and 5a being disposed therein by removing both sides thereof, and a bearing hole 5c being formed in a closure plate 5b disposed at the other end as shown especially in FIG. 3 to FIG. 5, and it is housed in a mounting hole 3c disposed in the mounting portion 3b in a state where the rotation thereof is prevented. Note that the shape of this case body 5 is one example and is not limited to that shown in the drawings. For example, as means for preventing the rotation, a protrusion can be provided on the case body instead of deforming the case body as a whole. However, removing both sides of the case body 5 to make it open as shown in the drawings enables air inside the case body 5 to easily escape outside when a cam slider described later slides, which brings about the advantage of improving the smooth operability of the small-sized hinge device.

Along an axial direction in a center portion of the case body 5, a shaft 6 having a flange portion 6a at one end and a deformed shaft portion 6b at the other end is disposed, a shaft portion 6c being received in a bearing hole 5c formed in the closure plate 5b of the case body 5 to be rotatable relatively to the case body 5. Between the flange portion 6a of the shaft 6 and the closure plate 5b, a washer 7 made of, for example, synthetic resin, is interposed, a through hole 7a, which is disposed in a center portion thereof, being passed through by the shaft portion 6c of the shaft 6. The washer 7 shown in the drawings works as a slider washer, which improves the smooth movement of pressure-contact sliding surfaces between the flange portion 6a of the shaft 6 and the closure plate 5b of the case body 5.

A fixed cam 8 is accommodated in the closure plate 5b side inside the case body 5, a through hole 8a with a circle-shaped sectional face, which is provided in a center potion thereof along its axial direction, being passed through by the shaft portion 6c of the shaft 6, and is constituted to rotate with the case body 5 by engaging arresting projections 8b and 8b, which are formed on both sides of an outer circumference thereof, with the arresting portions 5a and 5a, which are provided on both sides of the case body 5. Incidentally, the fixed cam 8 may alternatively be provided integrally with the case body 5.

Figure 6:
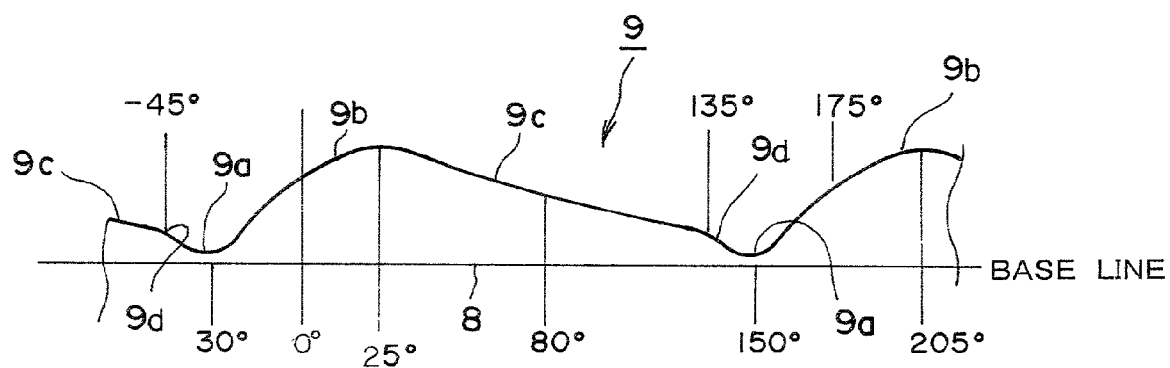
FIG. 6 is an expanded view of a cam portion of a fixed cam.

On a surface portion at one end of the fixed cam 8, a first cam portion 9 is disposed and as shown especially in FIG. 6, the first cam portion 9 is composed of a pair of concave portions 9a and 9a facing and symmetrical with each other, first inclined portions 9b and 9b forming one of the concave portions 9a and 9a and having large and steep slope surfaces, gently inclined plane portions 9c and 9c provided adjacent to the first inclined portions 9b and 9b, and second inclined portions 9d and 9d composed of the other small and gentle slope surface to form a concave portion 9a.

Inside the case body 5, a cam slider 10 is also accommodated to face the fixed cam 8, a deformed through hole 10a, which is also formed in a center portion thereof along its axial direction, being passed through by the deformed shaft portion 6d of the shaft 6. The cam slider 10 is rotatable and slidable in an axial direction together with the shaft 6 since it is arrested by the deformed shaft portion 6b of the shaft 6, and it has a second cam portion 11, which is composed of a pair of convex portions 11a and 11a, formed on a side thereof facing the first cam portion 9 of the fixed cam 8.

Figure 7:
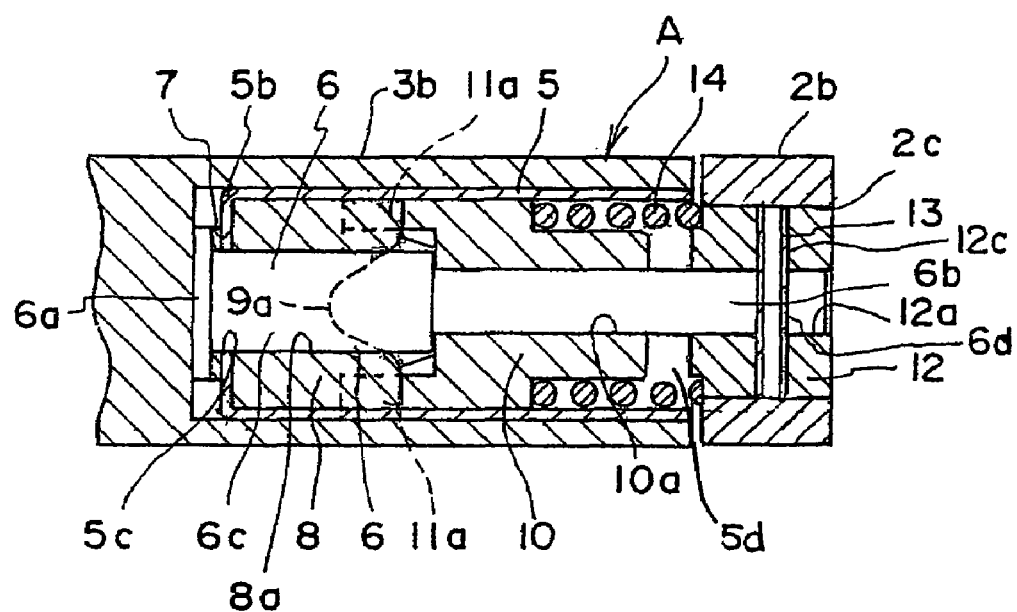
FIG. 7 is an explanatory view explaining the operation of the small-sized hinge device according to the present invention.

To a portion of the shaft 6 protruding from the open end of the case body 5, an arresting body 12 is secured by passing through and engaging the deformed shaft portion 6b of the shaft 6 into a deformed mounting hole 12a, which is formed in a center portion thereof along its axial direction, and fixing it thereto via a spring pin 13 inserted by pressure into mounting holes 6d and 12c, which are disposed in the deformed shaft portion 6b and the arresting body 12 respectively. On an outer circumference of the arresting body 12, a pair of rib portions 12b and 12b are formed along its axial direction, which is constituted to rotate with a transmitter section 2 by engaging with arresting hollow portions 2d and 2d of a mounting hole 2c provided in the mounting portion 2b of the transmitter section 2, as shown especially in FIG. 2 and FIG. 7.

Between the arresting body 12 and the cam slider 10, a compression spring 14 is interposed resiliently while being wound around the deformed shaft portion 6b of shaft 6, so that cam slider 10 is always biased slidably toward the fixed cam 8. Greases are coated portions between first cam portion 9 and second cam portion 11, between case body and cam slider 10, and between shaft 6 and cam slider 10.

Therefore, as shown especially in FIG. 6, when the transmitter section 2 and the receiver section 3 are in a closed state, the convex portions 11a and 11a of the second cam portion 11 in the cam slider 10 drop inside the first inclined portions 9b and 9b of the first cam portion 9 in the fixed cam 8 to stably keep their closed state, and when they begin to open, the convex portions 11a and 11a move up along the first inclined portions 9b and 9b of the convex portions 9a and 9a and move down along the inclined plane portions 9c and 9c, so that they are opened smoothly.

In this embodiment, when a relative opening angle of the transmitter section 2 (the first member) and the receiver section 3 (the second member) reaches 25 degrees, the convex portions 11a and 11a cross over the first inclined portions 9b and 9b to open them, and when it reaches around 45 degrees, they are opened automatically at an angle up to 150 degrees due to a resilient force of the compression spring 14. The second inclined portions 9d and 9d are shaped to be steep slope surfaces to engage with the convex portions 11a and 11a, so that after they are opened at an angle of up to 150 degrees, they do not return to the original state by reaction, or at the time, for example, when the liquid crystal display section 3a is operated. When they are opened at an angle of up to 150 degrees, stopper means not shown in the drawings (which is often disposed in a portion connecting the transmitter section and the receiver section) stops them.

The transmitter section 2 and the receiver section 3 in their open state are closed through the reverse process of the process described above, and are automatically closed by the process of the convex portions 11a and 11a dropping inside the first inclined portions 9b and 9b when they reach the opening angle of 25 degrees. When the transmitter section 2 and the receiver section 3 are closed, since the convex portions 11a and 11a move up along the inclined plane portions 9c and 9c against the resilient force of the compression spring 14 in the range of up to 25 degrees, they are not closed with an abrupt movement.

Incidentally, as materials used for the constituting members except the ones explained above, the case body 5 is made of brass and the shaft 6 is carburized and quenched SUM24L. The fixed cam 8 and the cam slider 10 are metallic sintered bodies with resin impregnating property, and are also carburized and quenched. The shaft 6, the fixed cam 8, and the cam slider 10 are plated with nickel on the surfaces thereof. The arresting body 12 is made of POM. The fixed cam 8 and the cam slider 10 may alternatively be made of resin, pressure-contact portions thereof being coated with metal.

To other than a twofold portable telephone, the small-sized hinge device according to this invention can also be applicable to a flipper-type portable telephone, where a keyboard section and a display section are disposed in an upper portion and a lower portion respectively of one body, and the surface of the keyboard section can be covered with a cover section.

Though the small-sized hinge device according to this invention is used in a twofold portable telephone in the explanation above, it should be noted that the small-sized hinge device according to this invention can also be used in other small-sized electronic equipment and OA equipment of various kinds, such as personal computers, electronic notebooks, electronic dictionaries, electronic diaries, and so on. When it is used in such equipment, the first member can be a keyboard body and the second member can be a display body, or the reverse can be possible.

What is claimed is:

1. A small-sized hinge device used for connecting mounting portions on each end portion of a first member and a second member to be relatively opened and closed by being nonrotatably inserted into mounting holes of said mounting portions, comprising:
   a case body having a closure plate with a bearing hole on one end portion, an open end portion on another end portion, and a baffle means on the circumference of said case body, said case body is nonrotatably inserted into mounting hole of either one of said members from the side of said closure plate;
   a fixed cam nonrotatably inserted on the side of said closure plate inside said case body, and having a through hole on the central portion in the axial direction and a first cam portion on one end portion;
   a shaft passing through said through hole of said fixed cam and said bearing hole of said closure plate, with one end portion thereof arrested outside of said closure plate and penetrating through said case body in the central axial direction thereof, and with another end portion protruded from the side of said open end portion;
   an arresting body mounted on the side protruding from said open end portion of said case body and engaged through said mounting hole of said mounting portion of either one of said members, with a rib portion mounted in circumferential axial direction;
   a cam slider slidably and nonrotatably mounted on said shaft, said cam slider having a second cam portion on the side confronting to said first cam portion;
   a compression spring interposed resiliently between said cam slider and said arresting body; and
   a slider washer provided on a portion of said shaft engaging with said closure plate of said case body.

2. A small-sized hinge device according to claim 1, wherein:
   said fixed cam is constituted independently of said case body and accommodated in said case body with the rotation thereof arrested by said case body.

3. A small-sized hinge device according to claim 2, further comprising:
   a first cam portion disposed in said fixed cam, composed of a concave portion, a first inclined portion forming the concave portion and having a large steep slope surface, a long gentle inclined plane portion provided adjacent to the first inclined portion, and a second inclined portion provided adjacent to the inclined plane portion forming the concave portion and having another small and steep slope surface, and
   a convex portion on said second cam portion of said cam slider contacting said first cam portion by pressure, dropping inside the first inclined portion of said first cam portion when the first member and the second member are in a closed state, and by opening both of the first member and the second member relatively to each other, said convex portion escaping from the first inclined portion of the concave portion to move down along the gently inclined plane portion, and when said first member and second member are opened at an angle close to the maximum opening angle, said convex portion dropping inside the concave potion from the second inclined portion.

4. A small-sized hinge device, according to claim 3, wherein:
   the convex portion of said second cam portion of said cam slider drops in the first inclined portion just before the first member and the second member are closed relatively to each other.

5. A small-sized hinge device according to claim 4, wherein:
   the first member and the second member are a transmitting section and a receiver section of a portable telephone respectively.

6. A small-sized hinge device used for connecting mounting portions on each of end portions of a first member and a second member to be relatively opened and closed by being nonrotatably inserted into mounting holes of said mounting portions, comprising:
   a case body having a closure plate with a bearing hole on one end portion, an open end portion on another end portion, and a baffle means on the circumference of said case body, said case body is nonrotatably inserted into mounting hole of either one of said members from the side of said closure plate;
   a fixed cam nonrotatably inserted on the side of said closure plate inside said case body, and having a through hole on the central portion in the axial direction and a first cam portion on one end portion;
   a shaft passing through said through hole of said fixed cam and said bearing hole mounted on said closure plate, with one end portion thereof arrested outside of said closure plate by E-ring and penetrating through said case body in the central axial direction thereof, and with another end portion protruded from the side of said open end portion;
   an arresting body mounted on the side protruding from said open end portion of said shaft and engaged through said mounting hole of said mounting portion of either one of said members, with a rib portion mounted in circumferential axial direction;

a cam slider slidably and nonrotatably mounted on said shaft, said cam slider having a second cam portion on the side confronting to said first cam portion;

a compression spring interposed resiliently between said cam slider and said arresting body; and a slider washer provided on a portion of the shaft by inserting between said E-ring fixed said shaft and said closure plate of said case body.

7. A small-sized hinge device according to claim 6, wherein:

said fixed cam is constituted independently of said case body and accommodated in said case body with the rotation thereof arrested by said case body.

8. A small-sized hinge device according to claim 7, further comprising:

said first cam portion disposed in said fixed cam, composed of a concave portion, a first inclined portion forming the concave portion and having a large and steep slope surface, a long and gentle inclined plane portion provided adjacent to the first inclined portion, and a second inclined portion provided adjacent to the inclined plane portion forming the concave potion and having another small and steep slope surface, and a convex potion on said second cam portion of said cam slider contacting said first cam portion by pressure, dropping inside the first inclined portion of said first cam portion when the first member and the second member are in a closed state, and by opening both of the first member and the second member relatively to each other, said convex portion escaping from the first inclined portion of the concave potion to move down along the gently inclined plane portion, and when said first member and second member are opened at an angle close to the maximum opening angle, said convex portion dropping inside the concave portion from the second inclined portion.

9. A small-sized hinge device, according to claim 8, wherein:

the convex portion of said second cam portion of said cam slider drops in the first inclined portion just before the first member and the second member are closed relatively to each other.

10. A small-sized hinge device according to claim 9, wherein:

the first member and the second member are a transmitting section and a receiver section of a portable telephone respectively.

* * * * *